United States Patent
Haraguchi

(10) Patent No.: US 6,597,279 B1
(45) Date of Patent: Jul. 22, 2003

(54) PORTABLE INFORMATION TERMINAL AND METHOD OF SETTING THE SAME

(75) Inventor: Shinya Haraguchi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/403,759

(22) PCT Filed: Mar. 5, 1999

(86) PCT No.: PCT/JP99/01071

§ 371 (c)(1),
(2), (4) Date: Nov. 1, 1999

(87) PCT Pub. No.: WO99/45722

PCT Pub. Date: Sep. 10, 1999

(30) Foreign Application Priority Data

Mar. 6, 1998 (JP) .......................................... 10-054696

(51) Int. Cl.[7] ................................................. G08B 5/22
(52) U.S. Cl. ...................... 340/7.2; 340/7.28; 340/7.29; 455/566; 379/67.1
(58) Field of Search ................................ 340/7.2, 7.28, 340/7.29; 455/566, 567, 412; 379/67.1, 156, 22.01

(56) References Cited

U.S. PATENT DOCUMENTS

| | | | | |
|---|---|---|---|---|
| 4,582,964 A | * | 4/1986 | Pickens | .................. 379/22.01 |
| 5,436,954 A | * | 7/1995 | Nishiyama et al. | .......... 455/566 |
| 5,479,476 A | * | 12/1995 | Finke-Anlauff | ............... 379/58 |
| 5,581,593 A | * | 12/1996 | Engelke | ......................... 379/52 |
| 5,640,448 A | * | 6/1997 | Toyoshima | ................... 379/165 |
| 5,742,912 A | * | 4/1998 | Nishiyama et al. | .......... 455/566 |
| 5,799,060 A | * | 8/1998 | Kennedy et al. | ........... 379/29.05 |
| 5,864,612 A | * | 1/1999 | Strauss et al. | .......... 379/142.03 |
| 5,937,360 A | * | 8/1999 | Nishiyama et al. | .......... 455/566 |
| 6,021,190 A | * | 2/2000 | Fuller et al. | ............. 379/212.01 |
| 6,094,568 A | * | 7/2000 | Nishiyama et al. | .......... 455/566 |

* cited by examiner

*Primary Examiner*—Daryl Pope
(74) *Attorney, Agent, or Firm*—Jay H. Maioli

(57) ABSTRACT

In a pager which can select and set an incoming tone to be outputted from a speaker from patterns of a plurality of incoming tones when a signal is received by the operation of a jog dial, the tone or melody corresponding to the pattern of the incoming tone selected by the jog dial is outputted from a speaker under the control of a controller during the selecting operation of the incoming tone based on a pattern selection screen of the incoming tones which is displayed on a liquid crystal display unit and includes a plurality of selection items. Setting information of the pattern of the incoming tone selected by using the jog dial is stored into the RAM during the selecting operation of the incoming tone. When a signal is received, the controller allows the tone or melody as a set incoming tone to be outputted from the speaker on the basis of the setting information of the incoming tone stored in the RAM.

8 Claims, 5 Drawing Sheets

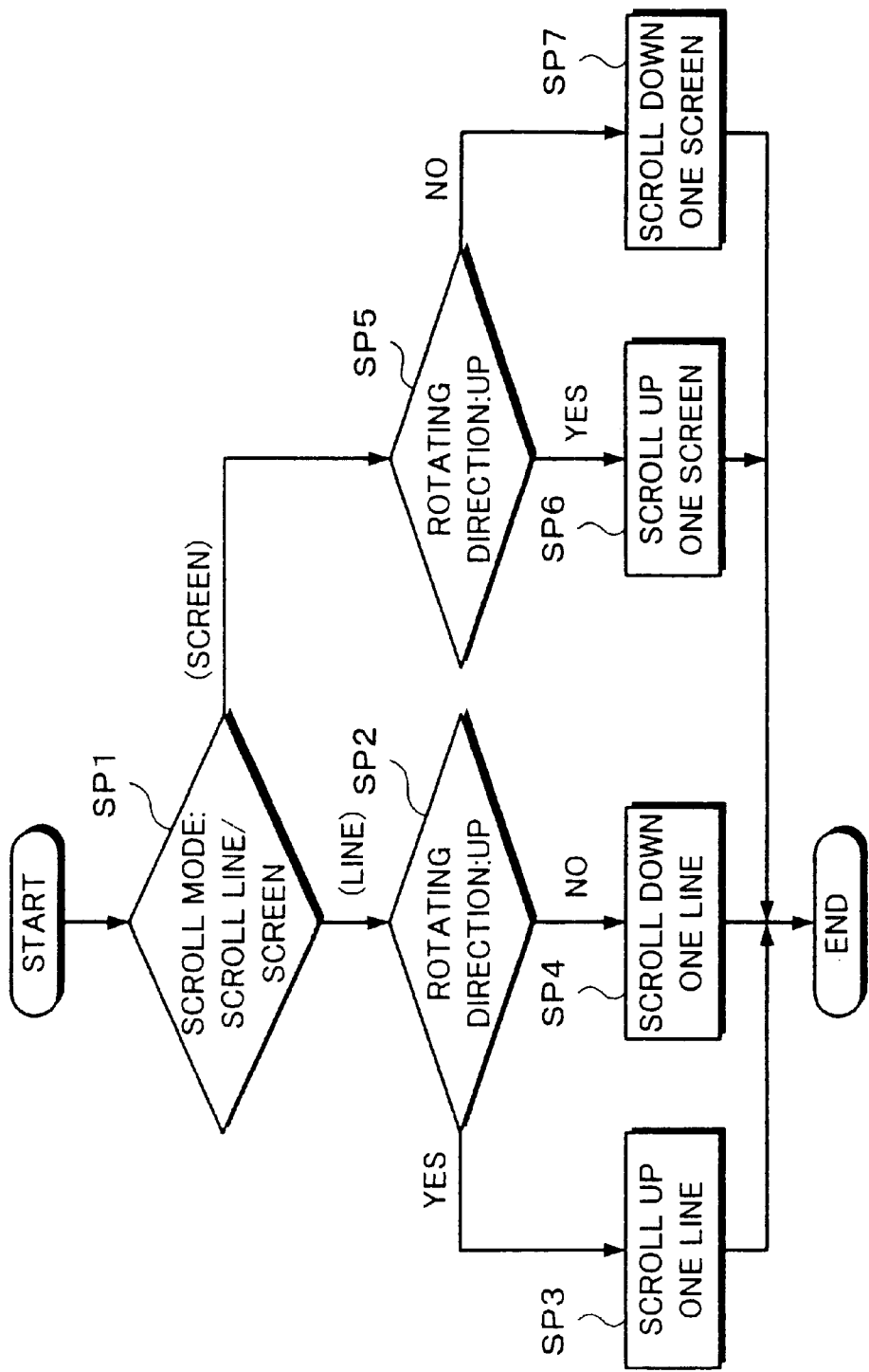

ALERT SELECT 2    ↓ JOG DOWN × 2

PATTERN SELECT 1    ↓ JOG PUSH × 1

PATTERN SELECT 2    ↓ JOG DOWN × 6

PATTERN SELECT 3    ↓ JOG DOWN × 3

PATTERN SELECT 4    ↓ JOG DOWN × 3

ALERT SELECT    ↓ JOG PUSH × 1

PORTABLE INFORMATION TERMINAL AND METHOD OF SETTING THE SAME

PORTABLE INFORMATION TERMINAL APPARATUS AND ITS SETTING METHOD

TECHNICAL FIELD

The invention relates to a portable information terminal apparatus and its setting method. Particularly, the invention relates to a portable information terminal apparatus and its setting method in which an incoming tone which is rung when data or a signal is received is selected from a plurality of selection items by the operation of a selection operating unit of a rotary dial type and set.

BACKGROUND ART

In recent years, a pager as a portable information terminal apparatus has rapidly been being spread. In association with it, the technical development of the pager is also remarkably progressing. Particularly, its miniaturization and light weight is rapidly being realized. Since an input device of the pager is also miniaturized in association with the miniaturization of the pager, a pager having a speed sensitive type input device of a rotary dial type (hereinafter, referred to as a jog dial) has been developed from a viewpoint of making its handling easy. According to the pager having the jog dial, when an incoming tone at the time of the reception of a message is selected and decided, in the case where a desired one of a plurality of incoming tones is selected by rotating the jog dial and, thereafter, it is determined by pushing the jog dial, a desired one of a plurality of incoming tones is chosen with reference to a menu of the incoming tones by rotating the jog dial. In this instance, since the names of tones and melodies are merely shown in the menu of the incoming tones, when it is finally determined, the user cannot know which tone or melody is rung.

There is a pager such that after the selection of the incoming tone was determined, the selected tone or melody is rung for a short time. However, if it differs from the expected tone or melody, it is necessary to again repeat the operations for selection and decision.

DISCLOSURE OF INVENTION

It is, therefore, an object of the invention to provide a portable information terminal apparatus and its setting method in which a setting operation of an incoming tone when a signal in a portable information terminal apparatus having a selection operating unit such as a jog dial or the like is received can be certainly performed by one operation.

To solve the above problem, according to the invention, there is provided a portable information terminal apparatus comprising: an output unit for outputting an incoming tone; a display unit on which a selection menu to select the incoming tone which is outputted from the output unit is displayed; a selection operating unit for performing a selecting operation of the incoming tone on the basis of the selection menu which is displayed on the display unit and includes a plurality of selection items; and a control unit for controlling the output unit so as to output the incoming tone when a signal is received, switching the display of the display unit on the basis of an input from the selection operating unit, and allowing the incoming tone corresponding to the selection item selected by the selection operating unit to be outputted from the output unit for a predetermined time during the selecting operation of the incoming tone based on the selection menu displayed on the display unit.

According to the invention, there is provided a setting method of a portable information terminal apparatus, comprising the steps of: displaying a selection menu including a plurality of selection items to select an incoming tone which is outputted from an output unit onto a display unit; performing a selecting operation of the incoming tone on the basis of the selection menu displayed on the display unit; and allowing the incoming tone corresponding to the selected selection item to be outputted from the output unit for a predetermined time during the selecting operation of the incoming tone based on the selection menu displayed on the display unit.

According to the invention, there is provided a portable information terminal apparatus comprising: a storing unit for storing a plurality of received reception data; a display unit on which the reception data read out from the storing unit is displayed and a selection menu including a plurality of selection items to select an incoming tone is displayed; a selection operating unit for performing a selection operating input of the reception data stored in the storing unit and performing a selecting operation of the selection item in the selection menu; an output unit for outputting the incoming tone; and a control unit for controlling the operations of the storing unit and the display unit on the basis of the input from the selection operating unit and allowing the incoming tone corresponding to the selection item selected by the selection operating unit to be outputted from the output unit for a predetermined time during the selecting operation of the incoming tone based on the selection menu displayed on the display unit.

BRIEF DESCRIPTION OF DRAWINGS

FIG. 4 is a flowchart for explaining a scrolling process of the screen using a jog dial;

BEST MODE FOR CARRYING OUT THE INVENTION

Figure 1:
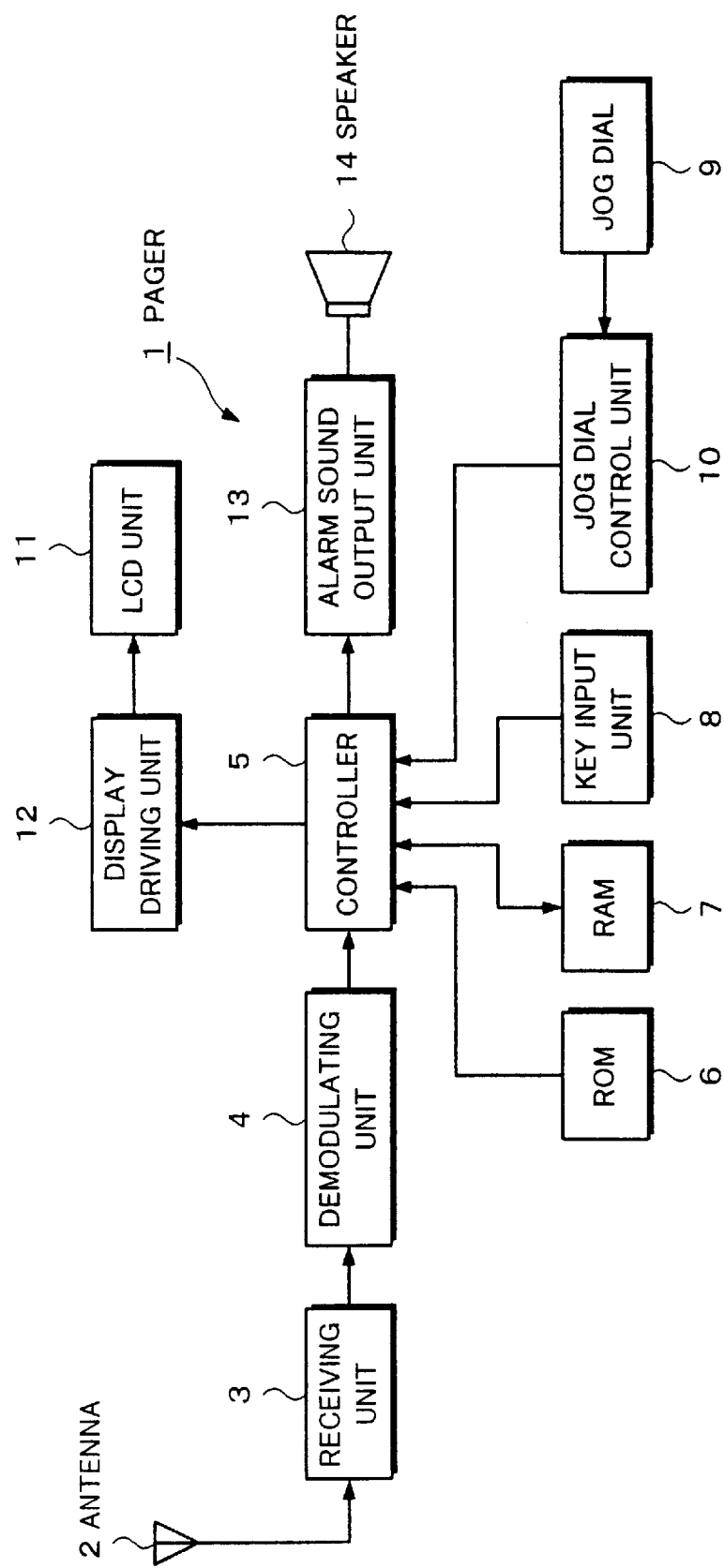
FIG. 1 is a block diagram showing a construction of a pager according to an embodiment of the invention.

The best embodiment for embodying the invention will now be described hereinbelow with reference to the drawings. First, a circuit construction of a portable information terminal apparatus of the invention will be described with reference to FIG. 1. FIG. 1 is a block diagram showing an example of the portable information terminal apparatus of the invention. In the embodiment of the invention, a pager is shown as an example of the portable information terminal apparatus and will be explained.

As shown in FIG. 1, a pager 1 of the invention is constructed by: a receiving unit 3 to which an antenna 2 is connected; a demodulating unit 4; a controller 5; memories such as ROM 6 and RAM 7; a key input unit 8 such as a dialer; a jog dial 9; a jog dial control unit 10; a liquid crystal display unit 11; a display driving unit 12; an alarm sound output unit 13; a speaker 14; and the like.

A signal transmitted from a base station is received by the antenna 2 and supplied to the receiving unit 3. The receiving unit 3 is constructed by a receiving circuit of, for example, a super heterodyne type. An output from the receiving unit 3 is supplied to the demodulating unit 4. The demodulating unit 4 is constructed by a binary or 4-value FSK demodulating circuit. When a message which coincides with a self address which is stored in the ROM 6 is transmitted from the base station, the demodulating unit 4 demodulates the message and supplies message data as reception data to the controller 5. When the reception data is supplied, the controller 5 supplies a control signal to generate an alarm sound to the alarm sound output unit 13.

The alarm sound output unit 13 forms a driving signal to drive the speaker 14 on the basis of the control signal from the controller 5 and supplies it to the speaker 14. The speaker 14 generates an alarm sound to notify the user of a fact that the pager 1 was called on the basis of an output signal from the alarm sound output unit 13. The user, thus, can know the data reception. In place of providing the speaker 14, it is possible to provide a light emitting diode (LED) and notify the wearer of a fact that the pager 1 was called by lighting on the LED.

Various processing programs to execute various operations of the pager 1 by the controller 5 have been stored in the ROM 6. The RAM 7 is a work area of the controller 5 and the message data demodulated by the demodulating unit 4 is written therein. Two folders of a folder for personal messages and a folder for information messages are provided in the RAM 7. If the received data is the information messages, namely, data such as news, weather forecast, or the like, it is written into the folder for the information messages. If the received data is data that is transmitted and received between the individuals, it is automatically written into the folder for the personal messages or is written by the manual operation by the wearer. Setting information of a pattern of the incoming tone set by the setting operation of the incoming tone is written and stored into the RAM 7 as will be explained hereinafter.

The controller 5 is constructed by a microcomputer, executes the various processing programs stored in the ROM 6, and performs various operation controls of the pager 1 on the basis of the operation input from the key input unit 8 or jog dial 9. When the reproduction of the message data is instructed by the key input unit 8 or jog dial 9, the controller 5 converts the message data stored in the RAM 7 into character data and supplies it to the display driving unit 12. The controller 5 has a timer function and the present time is displayed in the right shoulder portion of the liquid crystal display unit 11 as shown in FIG. 2.

The display driving unit 12 converts the supplied character data into display data and supplies it to the liquid crystal display unit 11. The liquid crystal display unit 11 displays the messages (character information) corresponding to the supplied display data.

Figure 3:
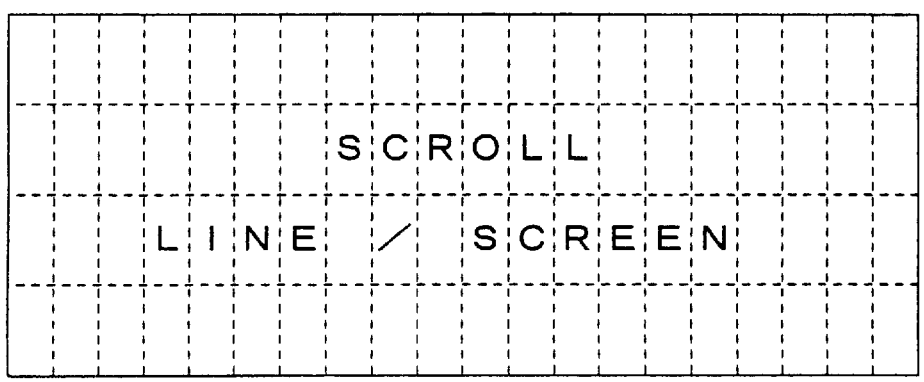
FIG. 3 is a diagram for explaining a display screen of a liquid crystal display unit of the pager.

For example, as shown in FIG. 3, the liquid crystal display unit 11 has a display area which can display character information of (20 characters in the lateral direction×4 lines in the vertical direction)=80 characters. The received message data is displayed in the display area of the liquid crystal display unit 11. The received message data is written into the RAM 7. When the user needs the message data, by operating the key input unit 8 or jog dial 9, the data is read out from the RAM 7 and can be displayed in the liquid crystal display unit 11. As mentioned above, the wearer of the pager 1 can recognize the incoming to the pager 1 owned by himself on the basis of the alarm sound from the speaker 14 and visually confirm the received messages which are displayed on the liquid crystal display unit 11.

Figure 2:
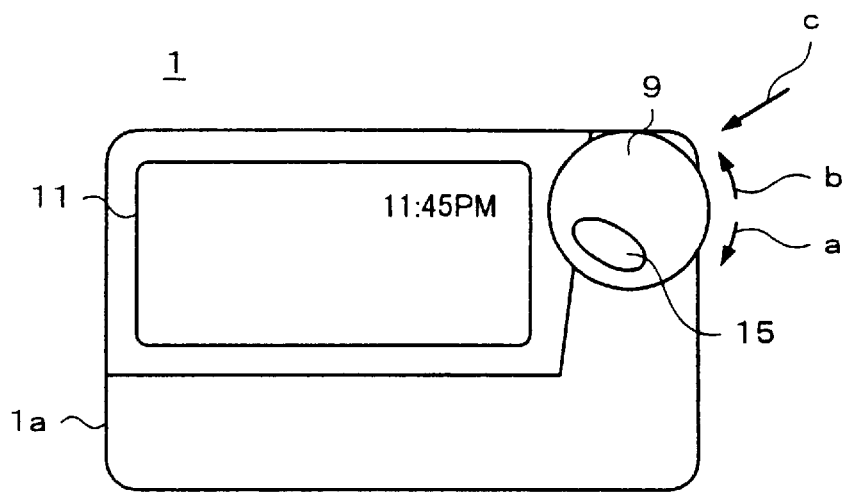
FIG. 2 is a diagram showing an external view of the pager according to an embodiment of the invention.

As shown in FIG. 2, the pager 1 according to the embodiment of the invention has a thin casing 1a having an almost rectangular shape. The liquid crystal display unit 11 is provided on one of the main surfaces of the casing 1a and the jog dial 9 and an escape key 15 are also provided. The jog dial 9 is provided in a corner portion of the casing 1a in a manner such that a part of the jog dial 9, namely, a knob portion is projected from the casing 1a, thereby enabling the wearer to rotate the jog dial by the finger. By rotating the knob of the jog dial 9 in the direction shown by an arrow a or b in FIG. 2, the scrolling operation of the display of the liquid crystal display unit 11, which will be explained hereinafter, or the selection and setting of the incoming tone is performed. By pushing the knob of the jog dial 9 in the direction shown by an arrow c in FIG. 2, the jog dial 9 performs a function as a decision key. For example, in the liquid crystal display unit 11, the message data stored in the RAM 7 is read out, any of the message data displayed on the liquid crystal display unit 11 is selected by rotating the knob of the jog dial 9 in the direction of the arrow a or b in FIG. 2, and the knob of the jog dial 9 is pushed in the direction shown by the arrow c in FIG. 2. Thus, the deciding operation of the selected message data is performed and the contents of the selected message data are displayed on the liquid crystal display unit 11. The escape key 15 is provided for the jog dial 9. The apparatus has a function to cancel the deciding state by the jog dial 9 mentioned above and return the operation to the one-preceding state such as setting state, selecting state, or the like by pushing the escape key 15.

A scroll mode of the messages in the liquid crystal display unit 11 of the pager 1 of the invention can be easily selected by the jog dial 9 as shown in FIG. 3. There are a line scroll (LINE) and a screen scroll (SCREEN) as selection items in the scroll mode of the liquid crystal display unit 11.

For example, the line scroll can be selected by rotating the knob of the jog dial 9 upward, namely, in the direction of the arrow b in FIG. 2 and the screen scroll can be selected by rotating the knob of the jog dial 9 downward, namely, in the direction of the arrow a in FIG. 2. After the scroll mode was selected by the operation of the knob of the jog dial 9, by pushing the jog dial 9 as it is in the vertical direction, namely, in the direction of the arrow c in FIG. 2, the scroll mode is decided. Information of the decided scroll mode is stored into the RAM 7.

An outline of an executing procedure to select the scroll mode and select the scrolling direction of the information by the jog dial 9 will now be described.

The controller 5 of the pager 1 recognizes the rotating operation of the knob of the jog dial 9 by an interruption from the jog dial control unit 10, reads rotation information of the knob of the jog dial 9 from the jog dial control unit 10, and starts a scroll processing operation of the display of the liquid crystal display unit 11.

In step SP1, the scroll mode information stored in the RAM 7 is checked to discriminate whether the scroll is the line scroll or the screen scroll. If the line scroll is set in step SP1, step SP2 follows.

In step SP2, the rotating direction information of the knob of the jog dial 9 is discriminated. If it is the direction of the arrow b in FIG. 2, namely, upward, the display of the liquid crystal display unit 11 is scrolled upward by a distance corresponding to one line in step SP3. If it is the direction of the arrow a in FIG. 2, namely, downward, the display of the liquid crystal display unit 11 is scrolled downward by a distance corresponding to one line in step SP4.

If the screen scroll is set in step SP1, step SP5 follows.

In step SP5, the rotating direction information of the knob of the jog dial 9 is discriminated. If it is the direction of the arrow b in FIG. 2, namely, upward, the display of the liquid crystal display unit 11 is scrolled upward by a distance corresponding to one screen in step SP6. If it is the direction of the arrow a in FIG. 2, namely, downward, the display of the liquid crystal display unit 11 is scrolled downward by a distance corresponding to one screen in step SP7. The scrolling process is finished. As mentioned above, the selection of the scroll mode and the selection of the scrolling direction can be freely performed by the simple operation of the jog dial 9 of the pager 1.

A program to set the incoming tone has total twelve kinds of patterns comprising four kinds of tones (ALERT1 to ALERT4) and eight kinds of melodies (music pieces such as Dixieland, Yankee doodle, Irish eyes, etc.) as patterns of the incoming tone which is rung at the time of signal reception. Those 12 kinds of patterns have been stored in the ROM 6 or a memory area of the controller 5. Any of the patterns of the incoming tones is selected by using the jog dial 9 or the like from the display screen of a layer structure which is displayed in the liquid crystal display unit 11.

With respect to the specific setting operation of the incoming tone, the selecting operation which is controlled by the controller 5 will now be described in accordance with display flowcharts of FIGS. 5A to 5F and 6A to 6F.

Figure 5A:
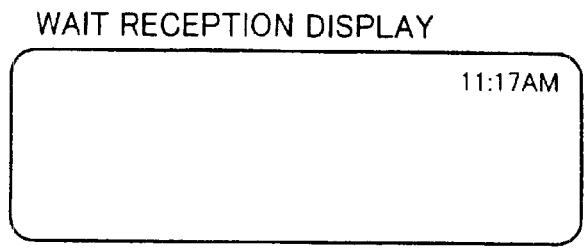
FIGS. 5A to 5F are diagrams of a display screen showing a procedure to set a pattern of an incoming tone of each pager.

In a standby state where the pager 1 can receive the data transmitted from the base station, namely, in a wait reception state, as shown in FIG. 5A, no specific information is displayed on the display screen of the liquid crystal display unit 11. However, the present time is displayed in the upper right portion of the display screen on the basis of the timer function of the controller 5.

Figure 5B:
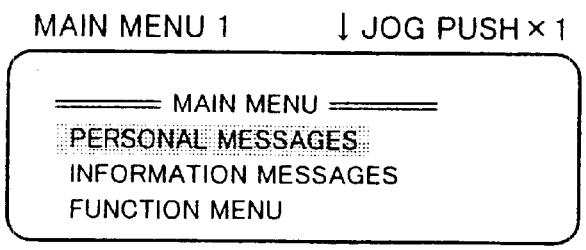

To select and decide the incoming tone in the wait reception state shown in FIG. 5A, by pushing once the knob of the jog dial 9 in the direction of the arrow c in FIG. 2 (JOGPUSH*1), an operation signal of the jog dial 9 is supplied to the controller 5 through the jog dial control unit 10 and the data regarding "MAIN MENU 1" in FIG. 5B is read out. Thus, "MAIN MENU" is displayed on the display screen of the liquid crystal display unit 11. In a state shown in FIG. 5B, "PERSONAL MESSAGES" in "MAIN MENU" is inversely displayed.

Figure 5C:
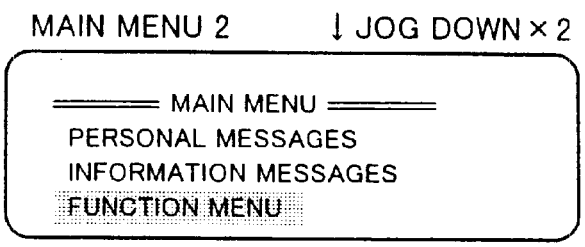

Subsequently, as shown in FIG. 5B, by rotating the knob of the jog dial 9 in a state where "MAIN MENU" is displayed on the liquid crystal display unit 11, "FUNCTION MENU" in "MAIN MENU" displayed on the liquid crystal display unit 11 is selected, and "FUNCTION MENU" is inversely displayed as shown in FIG. 5C.

Figure 5D:
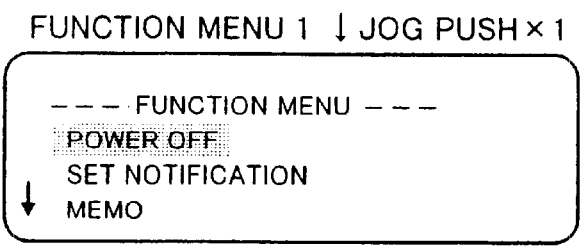

When the knob of the jog dial 9 is pushed once in the direction of the arrow c in FIG. 2 in a state shown in FIG. 5C, "FUNCTION MENU" is determined. The display of the liquid crystal display unit 11 is switched to the display screen showing the contents in "FUNCTION MENU" as shown in FIG. 5D. In a state shown in FIG. 5D, "POWER OFF" in "FUNCTION MENU" is inversely displayed.

Figure 5E:
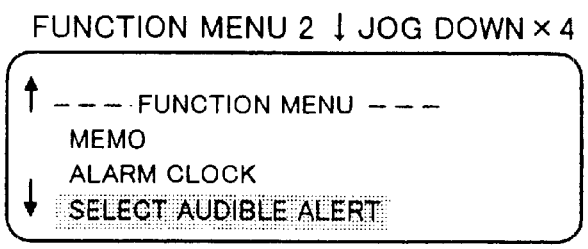

Subsequently, by rotating the knob of the jog dial 9 in the state where "FUNCTION MENU" shown in FIG. 5D is displayed, "SELECT AUDIBLE ALERT" in "FUNCTION MENU" is selected. As shown in FIG. 5E, "SELECT AUDIBLE ALERT" is inversely displayed.

Figure 5F:
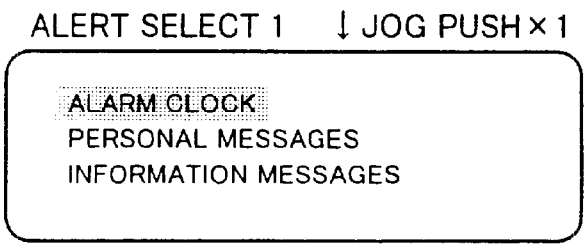

When the knob of the jog dial 9 is pushed once in the direction of the arrow c in FIG. 2 in a state shown in FIG. 5E, "SELECT AUDIBLE ALERT" is determined. The display of the liquid crystal display unit 11 is switched to the display screen to perform the alert selection as shown in FIG. 5F and the apparatus enters a state where it is possible to select the incoming tone the is set when which reception data is received. In a state shown in FIG. 5F, "ALARM CLOCK" among the patterns of the incoming tones is selected and inversely displayed.

Figure 6A:
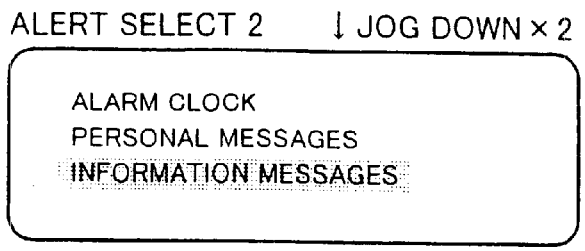
FIGS. 6A to 6F are diagrams of a display screen showing a procedure to set a pattern of an incoming tone of each pager.

In the case of setting the incoming tone which is rung when the information messages are received, by rotating the knob of the jog dial 9 on the display screen shown in FIG. SF, "INFORMATION MESSAGES" is selected as shown in FIG. 6A and "INFORMATION MESSAGES" is inversely displayed.

When the knob of the jog dial 9 is pushed once in the direction of the arrow c in FIG. 2 in a state shown in FIG. 6A, "INFORMATION MESSAGES" is determined. A screen of the pattern selection of the incoming tone is displayed on the liquid crystal display unit 11 as shown,in FIG. 6B. The apparatus enters a state where the pattern is set as an incoming tone and can be selected. In a state shown in FIG. 6B, a sound as an incoming tone is generated by the selected ringing pattern of "ALERT1" from the speaker 14 for, for example, 20 seconds.

Figure 6B:
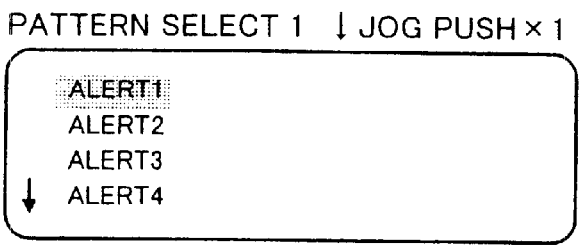
Figure 6C:
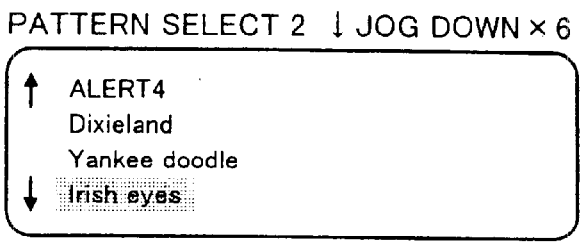
Figure 6D:
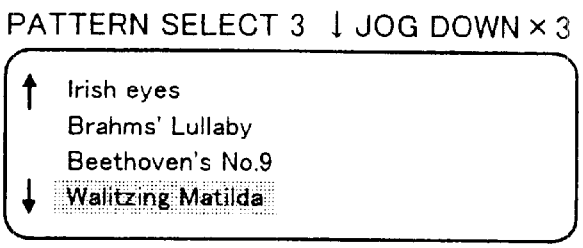

By rotating the knob of the jog dial 9 in the direction of the arrow a or b in FIG. 2 and the patterns "ALERT1" to "Auld long syne" are selected in a state where the screen of the pattern selection is displayed on the liquid crystal display unit 11 as shown in FIG. 6B, processes similar to those in the flowchart shown in FIG. 4 are executed. The display is inverted by the rotating operation of the knob of the jog dial 9 as shown in FIGS. 6B to 6E. The selected tones or melodies are successively switched and generated from the speaker 14.

Figure 6E:
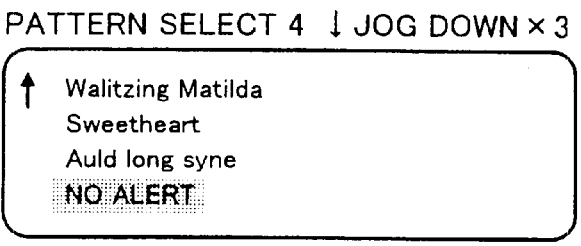

"NO ALERT" on the display screen of the pattern selection shown in FIG. 6E corresponds to a mode such that no incoming tone is generated from the speaker 14 at the time of the signal reception. When "NO ALERT" is selected, no incoming tone rings even if the data is transmitted from the base station.

In this manner, after the user listened to the selected tones or melodies which are generated from the speaker 14, he can select the tone or melody as a favorite incoming tone or alarm sound. When the selection of the tone or melody is finished, by once pushing the knob of the jog dial 9 in the direction of the arrow c in FIG. 2 on the basis of the pattern of the selected incoming tone, the pattern of the incoming tone is set to the selected pattern. The display on the liquid crystal display unit 11 is returned to the display screen shown in FIG. 6F.

As mentioned above, the pattern of the incoming tone which is rung when the information messages are received is set and the setting information of the pattern of the incoming tone is stored in the RAM 7 by the controller 5.

Figure 6F:
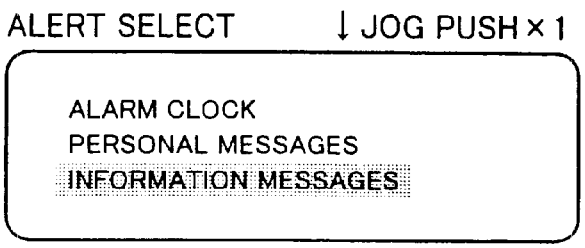

In case of setting the pattern of the incoming tone which is rung when the personal messages are received, by rotating the knob of the jog dial 9 in a state where the display screen shown in FIG. 6F is displayed on the liquid crystal display unit 11, "PERSONAL MESSAGES" is selected and "PERSONAL MESSAGES" is inversely displayed. In this state, by once pushing the knob of the jog dial 9 in the direction of the arrow c in FIG. 2, "PERSONAL MESSAGES" is determined. The screen of the pattern selection of the incoming tone is displayed on the liquid crystal display unit 11. The apparatus enters a state where to which pattern the incoming tone is set can be selected. In a manner similar to the case of setting the incoming tone regarding the information messages, the pattern of the incoming tone is selected and set. As mentioned above, the pattern of the incoming tone which is rung when the personal messages are received is set and the setting information of the pattern of the incoming tone is stored into the RAM 7 by the controller 5.

When the pager 1 receives the signal transmitted from the base station, the controller 5 allows the tone or melody as an incoming tone to be generated from the speaker 14 on the basis of the setting information of the pattern of the incoming tone stored in the RAM 7.

According to the pager 1 of the invention, when the pattern of the incoming tone is selected by the operation of the jog dial 9 as mentioned above, the tones or melodies in a range from "ALERT1" to "ALERT4" or from "Dixieland" to "Auld long syne" selected by rotating the knob of the jog dial 9 are outputted from the speaker 14 for a predetermined period of time and while the wearer or a person who sets is allowed to confirm the incoming pattern, the incoming tone can be certainly selected and decided by the single operation.

Although the pager has been described above as an example of the portable information terminal apparatus, the invention can be applied to any other apparatuses so long as they are the portable information terminal apparatuses such as a cellular phone and the like having a function to notify the user of the incoming tone.

According to the invention as mentioned above, in the portable information terminal apparatus which can set an incoming tone to be generated from the output unit when a signal is received, the incoming tone corresponding to the selected selection item during the selecting operation of the incoming tone based on the selection menu displayed on the display unit is generated from the output unit for a predetermined time. Therefore, since which incoming tone (tone or melody) is rung can be known before the selection of the incoming tone is determined, the incoming tone can be certainly set by the single operation. An effect such that the complicated operations for the user become unnecessary can be obtained.

What is claimed is:

1. A portable information terminal apparatus, comprising:
   an output unit for outputting an incoming tone;
   a display unit on which a selection menu to select said incoming tone that is outputted from said output unit is displayed;
   a selection operating unit for performing a selecting operation of said incoming tone based on said selection menu that is displayed on said display unit and that includes a plurality of selection items; and
   a control unit for: controlling said output unit to output said incoming tone when a signal is received; switching a display of said display unit based on an input from said selection operating unit; and outputting said incoming tone corresponding to a selection item selected by said selection operating unit from said output unit for a predetermined time during said selecting operation of said incoming tone based on said selection menu display unit.

2. The portable information terminal apparatus according to claim 1, wherein
   said apparatus further comprises a storing unit for holding said selection item selected by using said selection operating unit, and wherein said control unit allows said incoming tone to be outputted from said output unit based on said selected selection item held in said storing unit when said signal is received.

3. The portable information terminal apparatus according to claim 1, wherein
   said apparatus further comprises a receiving unit for receiving a transmitted signal and a decoder for demodulating an output signal from said receiving unit; and said control unit causes output data from said decoder to be displayed on said display unit.

4. A setting method of a portable information terminal apparatus, said method comprising the steps of:
   displaying a selection menu including a plurality of selection items to select an incoming tone that is outputted from an output unit on a display unit;
   performing a selecting operation of said incoming tone based on said selection menu displayed on said display unit; and
   allowing said incoming tone corresponding to said selected selection item to be outputted from said output unit for a predetermined time during said selecting operation of said incoming tone based on said selection menu displayed on said display unit.

5. A portable information terminal apparatus, comprising:
   a storing unit for storing a plurality of received reception data;
   a display unit on which said reception data read from said storing unit and a selection menu including a plurality of selection items to select an incoming tone are displayed;
   a selection operation unit for performing a selection operating input of said reception data stored in said storing unit and for performing a selecting operation of one of said selection items in said selection menu;
   an output unit for outputting said incoming tone; and
   a control unit for controlling operations of said storing unit and said display unit based on an input from said selection operating unit and causing said incoming tone corresponding to said selection item selected by said selection operating unit to be outputted from said output unit for a predetermined time during said selecting operation of said incoming tone based on said selection menu displayed on said display unit.

6. The portable information terminal apparatus according to claim 5, wherein
   said control unit causes said selection item in said selection menu selected by said selection operating unit to be stored in said storing unit.

7. The portable information terminal apparatus according to claim 6, wherein
   said control unit causes said incoming tone to be outputted from said output unit based on said selected selection item held in said storing unit when a signal is received.

8. The portable information terminal apparatus according to claim 1 or claim 5, wherein
   said selection operating unit has a rotatable operating unit.

* * * * *